United States Patent
Suominen

[11] Patent Number: 6,028,856
[45] Date of Patent: Feb. 22, 2000

[54] PROCEDURE AND SYSTEM FOR PROCESSING DATA TRAFFIC SIGNALS CARRYING INFORMATION

[75] Inventor: Antti-Jussi Suominen, Helsinki, Finland

[73] Assignee: Sonera Oyj, Sonera, Finland

[21] Appl. No.: 08/823,151

[22] Filed: Mar. 25, 1997

Related U.S. Application Data

[63] Continuation of application No. PCT/FI95/00534, Sep. 28, 1995.

[30] Foreign Application Priority Data

Sep. 30, 1994 [FI] Finland ..................................... 944582

[51] Int. Cl.⁷ .................................................. H04Q 11/00
[52] U.S. Cl. .......................... 370/351; 370/264; 370/392; 379/157; 379/203; 455/414
[58] Field of Search ..................................... 370/351, 376, 370/382, 383, 384, 392, 395, 409, 264; 455/403, 414, 456; 379/93.14, 157, 203, 268, 269

[56] References Cited

U.S. PATENT DOCUMENTS

| 5,212,691 | 5/1993 | Hokavi ..................................... 370/384 |
| 5,241,588 | 8/1993 | Babson, III et al. ..................... 379/201 |
| 5,327,421 | 7/1994 | Hiller et al. ............................. 370/395 |
| 5,333,186 | 7/1994 | Gupta ....................................... 379/201 |
| 5,504,804 | 4/1996 | Widmark et al. ........................ 455/414 |

FOREIGN PATENT DOCUMENTS

| 0 398 183 | 11/1990 | European Pat. Off. ......... H04Q 3/58 |
| 0 602 781 | 6/1994 | European Pat. Off. ......... H04Q 3/00 |
| WO 85/02510 | 6/1985 | WIPO ............................. H04M 3/42 |

OTHER PUBLICATIONS

Jonas Sundborg "Universal Personal Telecommunications (UPT)=Concept and Standardisation", Ericsson Review, vol. 70, No. 4, pp. 140–155 (1993).

Alcatel Electrical Communication, vol. 65 No. 1, "Intelligent Networks: Dedicated to Services", pp. 38–43, Oct. 1991.

Primary Examiner—Douglas W. Olms
Assistant Examiner—Shick Hom
Attorney, Agent, or Firm—Altera Law Group

[57] ABSTRACT

The present invention is associated with data traffic systems. Specifically, the invention relates to a procedure and system for forming a virtual exchange. The purpose with the virtual exchange is to provide customer-specific call transfer, intermediate call and chaining services in a public data traffic system. The customer is enabled to program and to store in the system those subscriber-specific characteristics and functions he desires. The subscriber's calls are marked, and the marked calls are routed to the virtual exchange for processing the characteristics of the call.

11 Claims, 1 Drawing Sheet

PROCEDURE AND SYSTEM FOR PROCESSING DATA TRAFFIC SIGNALS CARRYING INFORMATION

This is a continuation of PCT/FI95/00534 application filed Sept. 28, 1995.

BACKGROUND OF THE INVENTION

1. Field of the Invention

The present invention concerns a procedure as defined in the preamble to claim 1, and a data traffic system as defined in the preamble to claim 6, for processing data traffic signals carrying information.

2. Description of the Related Art

In prior art a data traffic system is known which comprises data traffic means for forwarding data traffic signals and in which data traffic signals are transmitted between the terminal devices of two subscribers, the A subscriber and the B subscriber. A subscriber is understood to be a customer making use of the services of the data traffic system. The A subscriber is advantageously understood to be that subscriber who initiates the call, or for instance calls the B subscriber he desires, that is advantageously the customer who receives the call. As a rule, the A subscriber is also accountable for the costs accruing during the connection.

In the course of technical development the general level of requirements has gone up. Various. services and characteristics are desired which can be controlled by the user's own tezninal device so that one can call another subscriber in the middle of a call in progress—an intermediate call; connect the call to another number—call transfers pick up an incoming call which is being announced on another terminal device or extension—call pick up; inhibit connection to the own extension of calls coming from certain numbers—call exclusion; and so on. There are several different alternatives. The services and characteristics in particular give added value to the customer-specific services, usually offered to enterprises. In implementing the idea of "The world is my office", these services and characteristics should be connectable to mobile phone systems as well.

At present, the above-mentioned additional functions are implemented in a public exchange which may have several hundred thousand extensions attached. In such implementation intelligent network-based designs are used in aid, which have been described e.g. in the paper "Intelligent Networks: Dedicated to Services, Alcatel Electrical Communication, Vol 65 No 1". With the aid of an intelligent network it is possible, for instance, to assign invoicing for the call to a given credit card number, to direct a customer's call to a non-busy telephone service on the end of a logical chain, such as a medical phone service, which thus may be located in a city or country other than that of is the customer using the service. The task of the intelligent network is to find automatically the first non busy telephone offering the service in question, once the subscriber has with the aid of control commands, such as DTMP commands, given notice that he wants a connection to the service. With the aid of the intelligent network also other similar services can be made available to the subscribers.

The problem in services implemented with the aid of intelligent networks is lack of subscriber specificity. The characteristics of public exchanges implemented with intelligent networks are the same for all subscribers, and the subscribers can use them by issuing control commands prior to establishing the data traffic connection, and while in this service also during the connection. The subscriber cannot himself in the intelligent network in a public exchange program those services and characteristics which he requires. In the present state it is impossible for the subscriber to program in a terminal device operating in a public network such characteristics as he desires, such as dialling and call inhibition, which would be made available from the public exchange. Whenever a subscriber desires subscriber-specific characteristics, he is compelled to procure an exchange of his own, which forwards the calls to the public network and which the subscriber may program as desired. The problem is that a proprietary exchange ties down capital, requires maintenance and space and frequently causes extra inconvenience to the subscriber.

SUMMARY OF THE INVENTION

The object of the present invention is to eliminate the problems mentioned. Specifically, the object of the invention is to disclose a customer-friendly, swift and simple procedure and system for controlling and processing, in the manner desired by the subscriber, data traffic signals carrying information which are to to be transmitted in a data traffic system, such as call establishing signals.

In addition, the object of the invention is to disclose a virtual exchange system operating virtually as a customer-specific exchange while the teleoperator is responsible for maintenance and servicing of the apparatus, and which affords services and functions substituting for the present functions of enterprise telephone exchanges.

Regarding the features characterizing the present invention, reference is made to the claims.

In the procedure of the invention, data traffic signals carrying information are transmitted in the data traffic system between two subscriber terminals, that of the A subscriber and that of the B subscriber. The data traffic signals may be digital or analog modulated acoustic signals, by the aid of which a call between two subscribers is established. The data traffic system may be an analog or digital mobile phone network, a public switching data transfer network (PSDN), a public switching telephone network (PSTN), or the like. For terminal can be used a mobile communicator, a modem, a telephone, or the like. As taught by the invention, a virtual exchange is connected to the data traffic system and predetermined data traffic signals are marked in a predetermined way. The signals may be marked e.g. by using a subscriber-specific code stored in the subscriber identifying unit, the serial number of the terminal, its call number or any other individually identifiable number or code of the terminal and/or the subscriber, The signals may further be marked by applying audio frequency technique, such as DTHF (dual tone multifrequency) or MFT (multifrequency tone) technique. Further, according to the invention, the data traffic signals which have been marked are directed to the virtual exchange, data traffic signal control information is provided in the virtual exchange, the incoming signals are examined in the virtual exchange for obtaining the control information, and the data traffic signals are subjected to predetermined operations as indicated by the control information. Advantageously, the incoming signals are continuously monitored in the virtual exchange, whereby the favourable situation is achieved in which the subscriber need not by any separate control command give notice that he desires to use the services or characteristics of the virtual exchange.

The advantage of the present invention over prior art is that with the aid of the invention individual services can be made available and implemented in a data traffic system without need of any separate subscriber exchange.

It is another advantage of the intention that with the aid of the invention calls from the subscribers can be intelligently controlled in accordance with services and functions which the subscriber desires and has modified himself. Furthermore, use of the data traffic system of the invention is exceedingly simple and easy to the subscriber and the subscriber need not invest in telephone technology likely to become obsolete soon.

The control information is advantageously combined with the data traffic signals by combining with them, with the aid of the terminal, audio frequency signals carrying the control information, which have advantageously been formed by DTMF and/or MFT technic.

In an advantageous embodiment of the invention, to the virtual exchange are associated programming means for changing the characteristics and/or functions of the virtual exchange; control commands for the characteristics and/or functions are input in the virtual exchange with the aid of said programming means, and the characteristics and/or functions are stored in the virtual exchange. Advantageously, to the virtual exchange a connection is established from another device; for instance, a connection between the subscriber and the computer controlling the virtual exchange, whereby the desired functions can be programmed in the virtual exchange.

Advantageously, the data traffic signals are marked subscriber-specifically and the data traffic signals are subjected to subscriber-specific operations in accordance with the subscriber-specific characteristics and/or functions stored in the virtual exchange. By such a procedure the characteristics of each user of the virtual exchange can by tailored to suit the user's needs.

The data traffic system of the invention, in which data traffic signal carrying information are transmitted between the terminals of two subscribers, the A subscriber and the B subscriber, comprises data traffic means for transmitting data traffic signals between two subscribers. As taught by the invention, the data traffic means comprise a virtual exchange, provided on the end of a logic chain from the subscriber and disposed to be programmable with the aid of control commands for arranging subscriber-specific characteristics in it. A logic chain is understood to mean that e.g. in a public telephone network in which data traffic signals are transmitted through exchanges the virtual exchange is on the premises of the teleoperator connected to the tele network. The marked data traffic signals of the subscriber may then pass through several exchanges to the virtual exchange, where the signals are subjected to the operations desired by the subscriber and are sent back into the public network and to the address specified by the subscriber.

In an advantageous embodiment, the virtual exchange comprises a router, connected to the data traffic system, for routing the data traffic signals in said data traffic system, as well as control means, connected to the router, for controlling the routing of data traffic signals. As router can advantageously be used a previously known switching field structure or the like. The control means may comprise a computer, a normal PC or a more efficient UNIX-based multitask computer using an RISC-processor.

The router advantageously comprises a first signalling interface for connecting the data traffic signals to the virtual exchange, and a switching field which is electrically connected to said first signalling interface. A signalling interface is understood to be the juncture between two devices or systems in cooperation, or here: virtual exchange—public tele network and control means—router, and agreement on cooperation specifications. The signalling interfaces can be implemented according to a number of different protocols, such as ITUP, ISUP, TUP and INAP.

Further, the control means advantageously comprise storage means for storing characteristics and/or functions, a second signalling interface for connecting the control commands to the virtual exchange, and programmable control logics for controlling the switching field to implement the characteristics and/or functions.

Advantageously, the data traffic system is a mobile phone system, advantageously a GSM system The mobile phone system may equally be one complying with another standard, such as NMT.

BRIEF DESCRIPTION OF THE DRAWINGS

In the following the invention is described with the aid of enclosed embodiment examples, referring to the attached drawing, wherein.

DETAILED DESCRIPTION OF THE INVENTION

Figure 1:
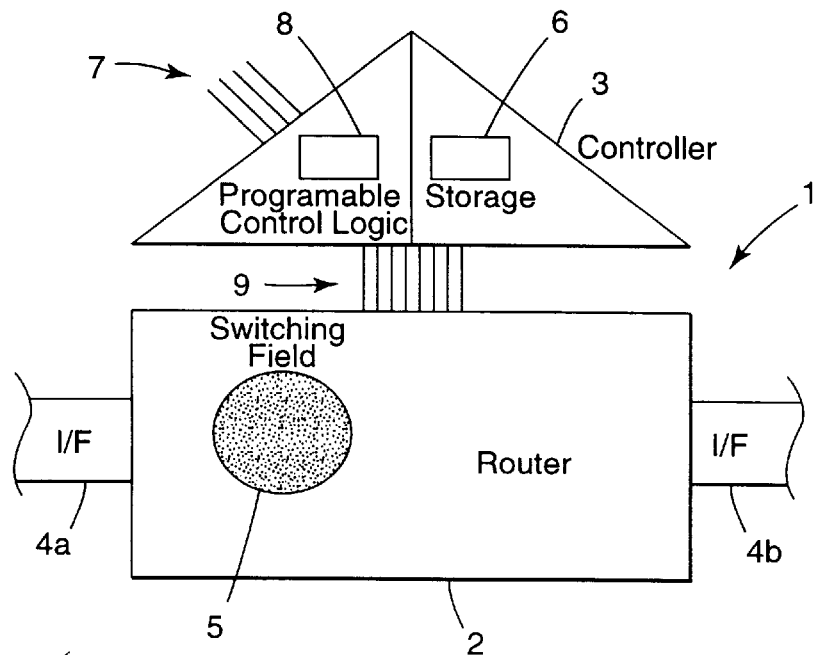
FIG. 1 presents a virtual exchange according to the invention.

The virtual exchange according to the invention depicted in FIG. 1 comprises a router 2, connected to a data traffic system, such as a PSTN, through a first signalling interface 4. In the embodiment of FIG. 1 the first signalling interface 4 has been devided in two, so that the first part 4a transmits the signals coming from the public tele network to the virtual exchange 1, and the second part 4b transmits to the tele network the signals going out from the virtual exchange. The virtual exchange further comprises a switching field 5, representing technology known in itself in the art and by the aid of which data traffic signals are transmitted to various addresses.

The virtual exchange depicted in FIG. 1 furthermore comprises as an essential component, control means 3, which may further comprise a computer, programmable control logics 8 and storage means 6 or any combination of these. For storage means 6 various data base stores can be used, in which a great amount of data can be stored. This is necessary because one virtual exchange 1 is employed to serve a number of subscribers, whose specific characteristics have to be stored in the virtual exchange.

The router 2 and control means 3 may be interconnected applying a switching technique known in itself in the art. Advantageously one uses for connection a signalling interface 9, implemented by applying INAP protocol. On the other hand, the router 2 and control means 3 may be integrated in one entity, in which case they can be connected applying internal bus designs known in themselves in the art.

Figure 2:
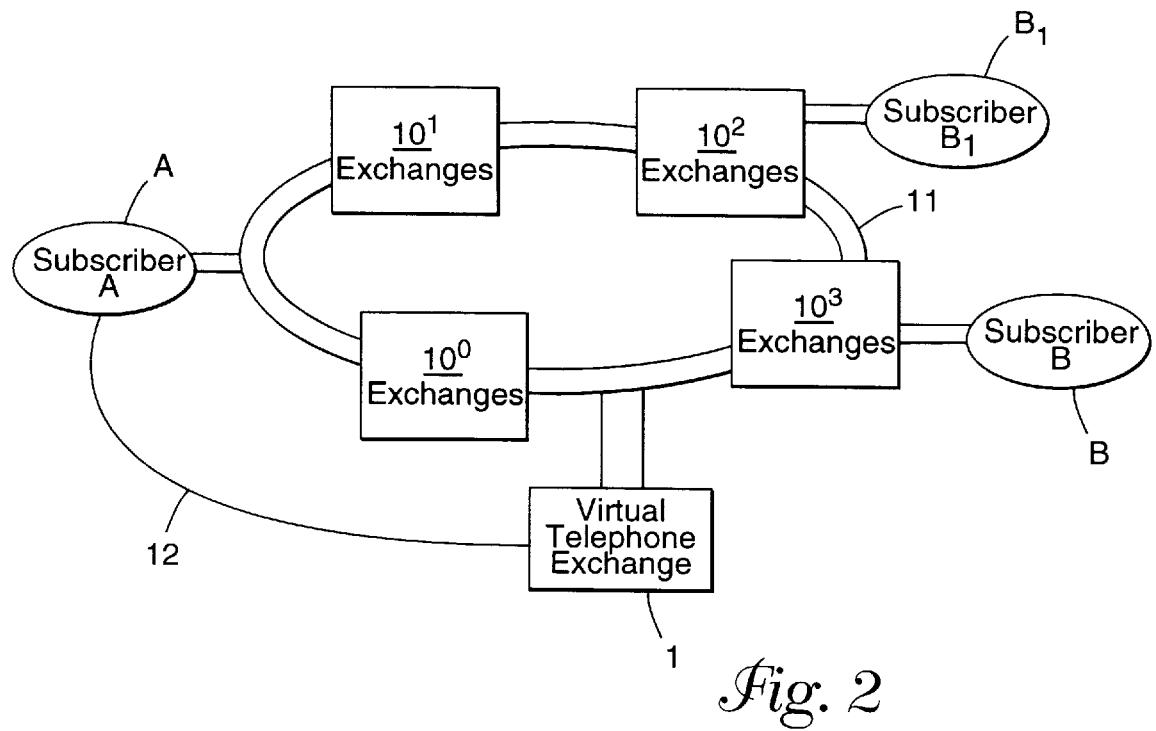
FIG. 2 presents schematically a data traffic system according to the invention.

Referring now to FIG. 2, the operation of the data traffic system according to the invention shall be described in the light of an advantageous example. The data traffic system is in this example a public switched telephone network 11, and it comprises a plurality of exchanges $10^1 \ldots 10^n$. To the data traffic system has further been connected a virtual exchange 1 conforming to the invention, through a signalling interface 4. The subscribers are in this example an A subscriber, who makes use of the services which he has programmed in the virtual exchange, a B subscriber whom the A subscriber calls, and a $B_1$ subscriber, to whom the A subscriber makes an intermediate call while speaking with the B subscriber.

In the example the A subscriber has through the programming connection 12 programmed such characteristics as he desires in the virtual exchange 1 so that with a given command sequence the A subscriber is enabled to make an intermediate call to his co-worker, whose working site is located in another city. At commencement of the call the A subscriber dials the number of the B subscriber. The signal sent out by the A subscriber is identified by the aid of the A subscriber's individual numeral code. On the basis of this numeral code the signal of the A subscriber is routed from the public network to be processed in the virtual exchange 1, where the control commands contained in the signal are automatically checked. In case the signal contains no request of special functions to be effected, the virtual exchange 1 switches the signal with the aid of the switching field 5 further into the tele network, to be transmitted to the B subscriber. When the B subscriber answers the call, the connection is completed and the subscribers may talk with each other. During the course of the conversation the A subscriber wishes to check on a detail with his co-worker, in this example the $B_1$ subscriber. He builds the intermediate call in that he dials in his terminal the command sequence programmed for this particular function, the virtual exchange 1 thereupon observing the incoming control command and on its basis connecting the signal to the $B_1$ subscriber and switching the original call to waiting state. The command sequence may for instance be as follows. A first dials ##[extension of $B_1$] whereby the connection with B goes to hold and a connection with $B_1$ is established for A. When the A subscriber so desires, the connection with the $B_1$ subscriber is broken, followed by return to the original call. Moreover, if A puts his phone down, B and $B_1$ will be connected with each other, whereby A has performed an active call transfer. It should further be noted that the A subscriber may toggle his connection between B and $B_1$.

Summarizing, it can be noted that a plurality of services like the example described above, which can be called upon with a terminal device, such as a telephone, can be programmed in the virtual exchange. It may be noted, moreover, that similar services are available in the way that the subscriber procures a physical exchange of his own, in which he programs the functions he desires. When operating with mobile phones, no such services are available without the design of the invention. Therefore the system of the present invention considerably simplifies a renders more versatile the teleoperator's offered range of services compared with prior situation. When employing a virtual exchange, the teleoperator may give the customer access to program his "own section" in the virtual exchange in just the way the customer himself wants to have it, and the customer has no need to invest in a telephone exchange, which frequently becomes obsolete as to its technology.

The invention is not delimited to concern the above-presented embodiment examples exclusively: numerous modifications are feasible within the scope of the inventive idea defined by the claims.

I claim:

1. A procedure in a data traffic system in which data traffic signals carrying information are transmitted between the terminals of two subscribers, an A subscriber and a B subscriber, comprising connecting a virtual exchange to the data traffic system;

marking the data traffic signals in a predetermined way;

routing the marked data traffic signals to the virtual exchange;

providing subscriber programmed control information for the marked data traffic signals in the virtual exchange;

examining the marked data traffic signals in the virtual exchange for obtaining the control information; and subjecting the data traffic signals to predetermined operations in accordance with the control information.

2. Procedure according to claim 1, wherein the control information is combined with the data traffic signals by combining the data traffic signals with audio frequency signals carrying the control information, the audio frequency signals being advantageously formed by dual tone multi-frequency (DTMF) or multi-frequency tone (MFT) technique.

3. Procedure according to claim 1, comprising connecting programming means to the virtual exchange for changing characteristics or functions of the virtual exchange;

inputting the control commands of characteristics or functions in the virtual exchange with the aid of the programming means; and storing the characteristics or functions in the virtual exchange.

4. Procedure according to claim 1, wherein the data traffic signals are marked subscriber-specifically or terminal-specifically, and the data traffic signals are subjected to subscriber-specific or terminal-specific operations in accordance with subscriber-specific characteristics or functions stored in the virtual exchange.

5. Procedure according to claim 1, wherein the data traffic signals are digitally or analogously modulated acoustic signals with the aid of which a connection between the two subscribers is formed.

6. A data traffic system in which data traffic signals carrying information are transmitted between the terminals of two subscribers, an A subscriber and a B subscriber, and comprising data traffic means for transmitting data traffic signals between the two subscribers, wherein the data traffic means comprise a virtual exchange (1), disposed on the end of a logic chain from a subscriber and disposed to be programmable with the aid of control commands from a subscriber for furnishing subscriber-specific characteristics therein.

7. Data traffic system according to claim 6, wherein the virtual exchange (1) comprises:

a router (2), connected to the data traffic system, for routing of data traffic signals in the data traffic system; and control means (3), connected to the router (2), for controlling the routing of data traffic signals.

8. Data traffic system according to claim 7, wherein the router (2) comprises:

a first signalling interface (4) for connecting data traffic signals to the virtual exchange (1); and a switching field (5), electrically connected to the first signalling interface.

9. Data traffic system according to claim 7, wherein the control means (3) comprise storage means (6) for storing the characteristics or functions;

a second signalling interface (7) for connecting control commands to the virtual exchange; and programmable control logics (8) for controlling the switching field (5) in accordance with the characteristics or functions.

10. Data traffic system according to claim 7, wherein the first signalling interface (4) is implemented in accordance with Integrated Services Digital Network User Part (ISUP) protocol.

11. Data traffic system according to claim 6, wherein the data traffic system is a mobile phone system.

* * * * *